US006908199B2

(12) United States Patent
Cha

(10) Patent No.: US 6,908,199 B2
(45) Date of Patent: Jun. 21, 2005

(54) OPTICAL ILLUMINATION SYSTEM AND IMAGE PROJECTION SYSTEM INCLUDING THE SAME

(75) Inventor: Yong-dok Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/817,802

(22) Filed: Apr. 6, 2004

(65) Prior Publication Data

US 2004/0212789 A1 Oct. 28, 2004

(30) Foreign Application Priority Data

Apr. 7, 2003 (KR) ................................ 10-2003-0021621

(51) Int. Cl.[7] .............................................. G03B 21/28
(52) U.S. Cl. ....................................................... 353/98
(58) Field of Search ................................ 353/7, 10, 38, 353/98, 81; 359/458, 462, 46, 464, 466, 478, 619, 534, 636, 637, 639, 737; 348/759, 756, 750, 742, 743, 771; 349/5, 7, 8

(56) References Cited

U.S. PATENT DOCUMENTS

| 5,005,968 A | * | 4/1991 | Tejima et al. ............... 353/122 |
| 5,250,967 A | * | 10/1993 | Miyashita .................... 353/38 |
| 5,604,624 A | | 2/1997 | Magarill ...................... 359/224 |
| 5,673,986 A | * | 10/1997 | Koo ............................ 353/98 |
| 5,853,240 A | * | 12/1998 | Tanaka et al. ................ 353/20 |
| 5,971,546 A | * | 10/1999 | Park ............................ 353/38 |
| 6,118,584 A | * | 9/2000 | Van Berkel et al. ......... 359/463 |
| 6,817,719 B2 | * | 11/2004 | Rudolph et al. .............. 353/37 |

* cited by examiner

Primary Examiner—William C. Dowling
(74) Attorney, Agent, or Firm—Stanzione & Kim, LLP

(57) ABSTRACT

An optical illumination system and an image projection system including the same include a light source, at least one illuminating lens and a Mangin mirror that illuminate light emitted from the light source on a predetermined reflective device, the Mangin mirror including a concave refracting surface that refracts and transmits light incident from the illuminating lens, and a convex reflecting surface disposed behind the concave refracting surface to internally reflect the light refracted by the concave refracting surface back toward the concave refracting surface and tilted with respect to the illuminating lenses. The light reflected from the convex reflecting surface and then refracted through the concave refracting surface propagates along a path that is different from a path of the light emitted from the illuminating lens.

30 Claims, 3 Drawing Sheets

OPTICAL ILLUMINATION SYSTEM AND IMAGE PROJECTION SYSTEM INCLUDING THE SAME

CROSS-REFERENCE TO RELATED APPLICATIONS

This application claims the priority of Korean Patent Application No. 2003-21621, filed on Apr. 7, 2003, in the Korean Intellectual Property Office, the disclosure of which is incorporated herein in its entirety by reference.

BACKGROUND OF THE INVENTION

1. Field of the Invention

The present invention relates to an optical illumination system designed to emit light onto a reflective display device with micromirrors that turn light on or off by changing angles of reflection, and a projection system including the same.

2. Description of the Related Art

In general, an image projection system that can be applied to rear projection televisions or front projection projectors includes an optical illumination system, a display device, and a projection optical system. The display device modulates light illuminated by the optical illumination system, and the projection optical system projects the modulated light to display an enlarged image.

Projection systems have been developed to use a digital light processing (DLP) device fabricated using micro electro mechanical system (MEMS) technology as a reflective display device. The DLP device is also referred to as a digital micromirror device (DMD).

A DLP device for creating an image used in a projection system is a two-dimensional array made up of a plurality of micromirrors, each of which represents a single pixel. To create an image, each micromirror is driven in response to a corresponding image signal and turns light on or off by changing a reflection angle of incident light.

When the DLP device is used as a reflective display, an optical system is constructed so that a path of light emitted from an optical illumination system and entering the DLP device is different from that of light reflected by the DLP device in order to produce an image.

Typically, a total reflection prism is used in an optical illumination system to separate light emitted from the optical illumination system from light propagating toward a projection optical system.

U.S. Pat. No. 5,604,624 discloses an optical system for projection display configured such that light emitted from a light source passes through a total reflection prism and is incident on a DLP device (called DMD therein).

In general, a prism type projection system using a total reflection prism to separate light is constructed such that the total reflection prism is positioned in the optical illumination system to totally reflect light and illuminate the light onto a reflective display device. The illuminated light is reflected by the reflective display into a projection optical system. In this case, although the light entering the projection optical system strikes the total reflection prism, most of the light is transmitted toward the projection optical system since an incident angle of light with respect to a surface of the total reflection prism is small. That is, the light illuminated into the reflective display device is separated from light reflected by the reflective display device under a total reflection condition of the prism.

As disclosed in the above-cited reference, the total reflection prism is comprised of two or more prisms to separate the reflected light from light illuminated from the light source. In this case, the two or more prisms are fabricated and assembled in different shapes. Each prism must be fabricated to have a precise angle.

Thus, difficulties in fabrication and assembling the total reflection prism degrade manufacturing and assembling capabilities, thus increasing manufacturing costs. The light reflected off a total reflection prism plane between the reflective display device and the projection optical system tends to enter the projection optical system, which may adversely affect image contrast.

SUMMARY OF THE INVENTION

In order to solve the above and/or other problems, it is an aspect of present invention to provide an optical illumination system with a simple structure so as to reduce manufacturing costs and remove degradation that tends to occur in a total reflection prism type optical system, and an image projection system including the same.

Additional aspects and advantages of the invention will be set forth in part in the description which follows and, in part, will be obvious from the description, or may be learned by practice of the invention.

The foregoing and/or other aspects of the present invention can be achieved by providing an optical illumination system used with an image projection sytem comprising a light source, at least one illuminating lens and a Mangin mirror that illuminate light emitted from the light source on a predetermined reflective device, the Mangin mirror including a concave refracting surface that refracts and transmits light incident from the illuminating lens, and a convex reflecting surface disposed behind the concave refracting surface to internally reflect the light refracted by the concave refracting surface back toward the concave refracting surface and tilted with respect to the illuminating lenses, and the light reflected from the convex reflecting surface and then refracted through the concave refracting surface propagates along a path that is different from a path of the light emitted from the illuminating lens.

The concave refracting surface may have a negative radius of curvature of about 20 to 70 mm, and the convex reflecting surface may have a negative radius of curvature of about 30 to 100 mm.

The light source may be a lamp type, and the system may further comprise an optical element that is disposed between the light source and the illuminating lenses to convert the light emitted from the light source into a uniform beam and change a shape of the beam into another shape corresponding to a plane of the reflective device.

The system may further comprise a color separation unit that separates the light emitted from the light source by wavelength.

The reflective device may be a reflective display that includes a two-dimensional array of micromirrors, each being driven in such a manner as to selectively reflect the illuminated light in a desired direction.

The foregoing and/or other aspects of the present invention can be also achieved by providing an image projection system, the system comprising an optical illumination system having a light source, at least one illuminating lens and a Mangin mirror to illuminate light emitted from the light source on a reflective display, the Mangin mirror having a concave refracting surface that refracts and transmits light incident from the illuminating lenses, and a convex reflecting surface disposed behind the concave refracting surface to internally reflect the light refracted by the concave refracting surface back toward the concave refracting surface and titled with respect to the illuminating lens. The light reflected from the convex reflecting surface and then refracted through the concave refracting surface propagates along a path that is different from a path of the light emitted from the illuminating lens such that the light is obliquely incident on the reflective display. The reflective display includes a two-dimensional array of micromirrors, each being driven in such a manner as to selectively reflect the light illuminated by the optical illumination system toward a projection optical system to form an image on a screen.

The foregoing and/or other aspects of the present invention can be achieved by providing an optical illumination system used with an image projection system having a reflective device and a projection optical system, the optical illumination system comprising: a light source emitting light corresponding to an image along a first path; and a Mangin mirror having a first surface and a second surface to refract the light received from the light source through the first surface toward the second surface along a second path, to reflect the refracted light toward the first surface along a third path using the second surface, and to transmit the reflected light toward the reflective device along a fourth path.

According to another aspect of the present invention, a thickness between the first surface and the second surface varies with respect to a distance from a center of the Mangin mirror, and each of the first and second surfaces has a curved surface having a radius varying according to a distance from a center of the Mangin mirror.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
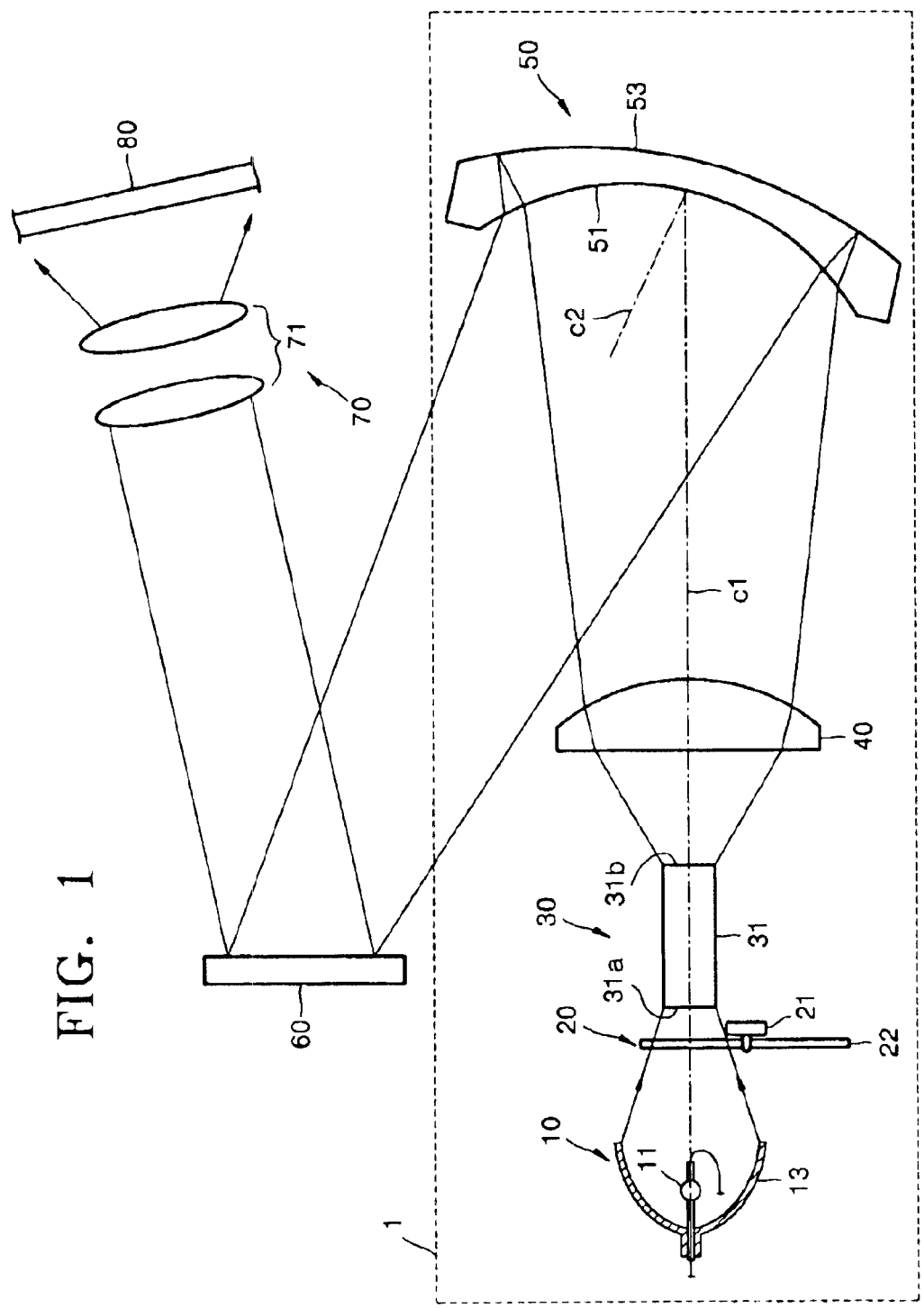
FIG. 1 is a schematic diagram of an image projection system including an optical illumination system according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows an image projection system with an optical illumination system 1 according to an embodiment of the present invention. Referring to FIG. 1, the optical illumination system 1 includes a light source 10, at least one illuminating lens 40 and a Mangin mirror 50 that illuminate light emitted from the light source 10 onto a predetermined reflective device. In addition to the optical illumination system 1, the image projection system further includes a reflective display 60, which is the predetermined reflective device, and a projection optical system 70.

The light source 10 can be lamp type. The lamp type light source 10 includes a lamp 11 that emits light, and a reflector 13 that reflects the light emitted by the lamp 11 and guides the light along a propagation path. The reflector 13 may be an ellipsoidal or parabolic mirror. The ellipsoidal mirror has two focal points, one of which is located at a location of the lamp 11, and the other one of which is placed at a location where the light is focused. If the parabolic mirror is used, a focal point is located at the location of the lamp 11, and all light rays emitted from the lamp 11 and reflected off the reflector 13 emerge parallel to one another. In FIG. 1, the reflector 13 is an ellipsoidal mirror.

The optical illumination system 1 further includes an optical element that converts light emitted from the light source 10 into a uniform beam and shapes the beam. In order to realize colors, the optical illumination system 1 further includes a color separation unit 20 that separates the light emitted from the light source 10 according to a wavelength of the light.

In FIG. 1, the optical element 30 is a light tunnel 31, i.e., a glass rod, and the color separation unit 20 includes a color wheel 22 that can be rotated by a driving source 21.

The light tunnel 31 has a rectangular parallelepiped shape with entrance and exit surfaces 31a and 31b orthogonal to an optical axis c1. The light tunnel 31 mixes light to a uniform luminance distribution by reflecting and scattering the light emitted from the light source 10. Furthermore, the light tunnel 31 is designed such that the exit surface 31b has a width-to-length ratio proportional to that of an effective plane used by the reflective display 60 to produce an image. This causes a shape of a light beam exiting through the exit surface 31b to be equal to a shape of a plane of the reflective display 60. The exit surface 31b of the light tunnel 31 becomes an object surface 35 in FIG. 2. Here, when the optical element 30 is the light tunnel 31, the reflector 13 of the lamp type light source 10 may be an ellipsoidal mirror. When the reflector 13 of the lamp type light source 10 is a parabolic mirror, it is possible to further include a condensing lens (not shown) between the light source 10 and light tunnel 31 to convert the parallel beam into a beam converging beam. Meanwhile, as is well known in the art, the optical element 30 may include a pair of fly eye lenses (not shown).

The optical element 30 may have other various configurations to convert the light emitted from the lamp type light source 10 into a uniform beam and to change a shape of the beam into another shape corresponding to a plane of the reflective display 60.

The color wheel 22 used as the color separation unit 20 is rotated by the driving source 21. As is well known in the art, the color wheel 22 can include a plurality of color filter portions, for example, equally partitioned color portions, thereby selectively and sequentially transmitting specific colors of light. The color wheel 22 rotates to sequentially transmit a plurality of color beams. Various changes in construction of the color separation unit 20 to separate colors may be made.

Figure 2:
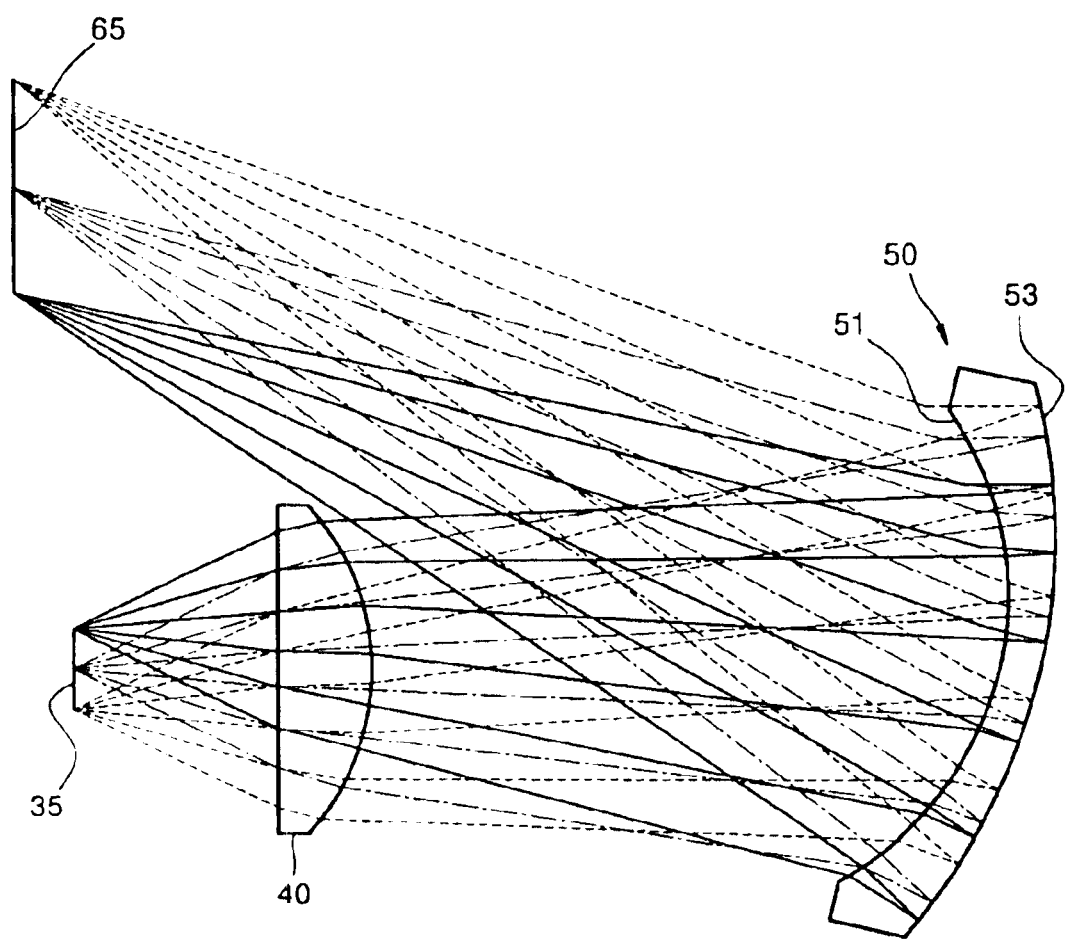
FIG. 2 shows a path in which a divergent light emitted from each point on an object surface is collected by an illuminating lens, reflected by Mangin mirror, and focused onto an image surface in the image projection system shown in FIG. 1.

Referring to FIG. 2, the illuminating lens 40 condenses light emitted from the exit surface 31b of the light tunnel 31, that is, the object surface 35. The Mangin mirror 50 then separates the light path of the projection optical system 70 from that of the optical illumination system 1 according to a tilt angle of the reflective display 60, which is a digital light processing (DLP) device. To achieve this, the Mangin mirror 50 is inclined with respect to the illuminating lens 40. That is, a central axis c2 of the Mangin mirror 50 forms a predetermined angle with the optical axis c1 extending from the light source 10 to the illuminating lens 40.

The Mangin mirror 50 has a concave refracting surface 51 that refracts light from the illuminating lens 40, and a convex reflecting surface 53 that is disposed behind the concave refracting surface 51. An optical medium having a predetermined refractive index is placed between the concave refracting surface 51 and convex reflecting surface 53. For example, the Mangin mirror 50 can be a meniscus lens whose rear surface is a reflecting surface. It is to be noted that the present invention disclises a Mnagin mirror for illustrative purposes only, and is not to be limited to only a Mangin mirror but may use any other reflection and reflection type unit that provides the intended aspects and/or features of the invention as disclised herein.

While the concave refracting surface 51 refracts and transmits incident light, the convex reflecting surface 53 internally reflects the light refracted by the concave refracting surface 51 back toward the concave refracting surface 51. In this case, the convex reflecting surface 53 is preferably a totally reflecting surface.

When the optical illumination system 1 is applied to an image projection system employing the reflective display 60 according to this embidiment, the concave refracting surface 51 may have negative radii of curvature of about 20 to 70 mm, and the convex reflecting surface 53 may have a negative radius of curvature in the range of about 30 to 100 mm. In this case, the concave refracting surface 51 and convex reflecting surface 53 have negative radii of curvature due to a direction of these surfaces. In the field of optics, the radius of curvature of the surface of a lens or mirror can be positive or negative depending on the direction of the surface.

When the Mangin mirror 50 having the concave refracting surface 51 and the convex reflecting surface 53 is employed as described above, the light reflected off from the convex reflecting surface 53 is refracted through the concave refracting surface 51 and travels along a path that is different from that of light emitted from the illuminating lens 40.

As shown in FIG. 2, a divergent beam of light that emerges from each point on the object surface 35 (the exit surface 31b of the light tunnel 31 shown in FIG. 1) condenses by the illuminating lens 40 and the Mangin mirror 50 to be focused onto an image surface 65, that is, the reflective display 60.

As is evident from FIGS. 1 and 2, the light emerging from the object surface 35, for example, the exit surface 31b of the light tunnel 31, is collected by the illuminating lens 40, and is incident onto the reflective display 60 at an appropriate angle by condensing, refracting, and reflecting actions of the Mangin mirror 50.

Since the Mangin mirror 50 serves as both a lens and a reflecting mirror, it is possible to reduce the number of optical elements required to construct the optical illumination system 1.

Figure 3:
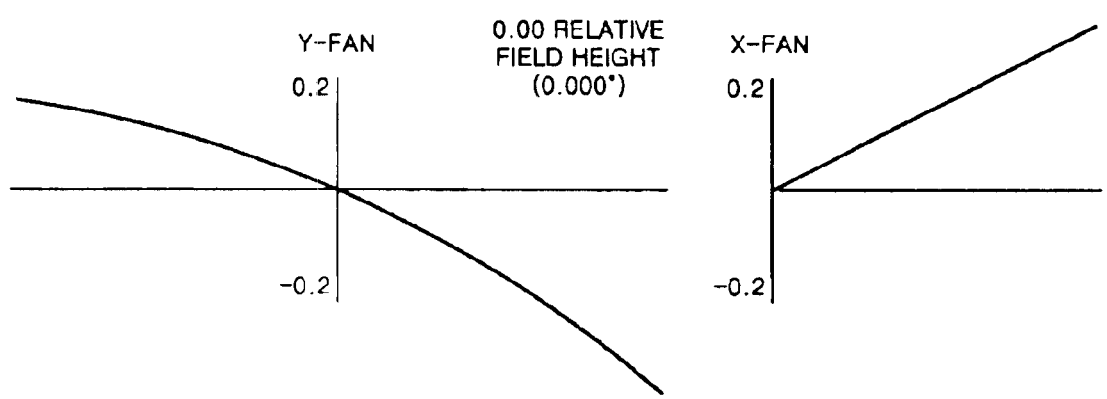
FIG. 3 shows the degree of aberration of the Mangin mirror shown in FIG. 1.
Figure 4:
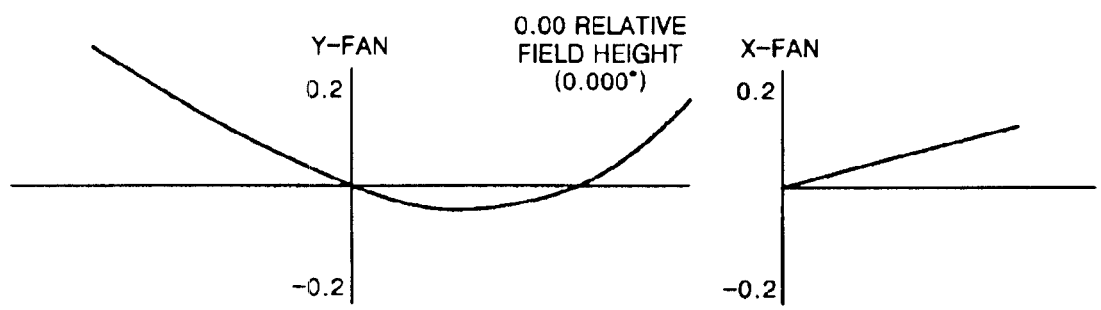
FIG. 4 shows the degree of aberration of a general mirror having a radius of curvature and other factors similar to those of the Mangin mirror.

To demonstrate the excellent performance of the Mangin mirror 50, FIGS. 3 and 4 illustrate the degrees of aberration in the Mangin mirror 50 having a specific radius of curvature and a general mirror having a similar radius of curvature to the Mangin mirror 50, respectively.

FIG. 3 illustrates the degree of aberration in the Mangin mirror 50 when the radii of curvatures of the concave refracting surface 51 and convex reflecting surface 53 are −60 mm and −95 mm, respectively, an object distance is 150 mm, an effective focal length (EFL) is 60 mm, and an angle of incidence on the image surface 65 is 20 degrees.

FIG. 4 illustrates the degree of aberration in the general mirror when the radius of curvature of the general mirror is −94 mm, an object distance is 150 mm, an effective focal length is 60 mm, and an angle of incidence on an image surface is 20 degrees.

As is evident from a comparison between the results shown in FIGS. 3 and 4, using the Mangin mirror 50 can reduce aberration to less than half that when a general mirror is used in similar conditions. Meanwhile, the inclusion of optical components between the light source 10 and the illuminating lens 40 is not limited to those shown in FIG. 1, and various modifications can be made thereto.

The optical illumination system 1 according to this embodiment of the present invention includes the lamp type light source 10, the optical element 30 that produces a uniform beam and shapes the beam, the color separation unit 20, at least one illuminating lens 40, and the Mangin mirror 50. This construction enables light emitted from the light source 10 to be illuminated on a reflective device, that is, the reflective display 60, with high optical efficiency.

The size of a beam of light illuminated by the optical illumination system 1 is arranged to coincide with that of an effective display region of the reflective display 60. Furthermore, the illuminated light has a uniform distribution.

Thus, since the optical illumination system 1 of the present invention illuminates light obliquely on the reflective display 60, the light illuminated on the reflective display 60 follows a different path from that of light reflected by the reflective display 60, thereby allowing a DLP device to be used as the reflective display 60.

Thus, it is an aspect of the invention to use a DLP device as the reflective display 60 in an image projection system including the optical illumination system. That is, in this embodiment of the invention, the reflective display 60 may be a DLP device that is a two-dimensional array of micromirrors that are driven in such a manner as to selectively reflect the illuminated light in a desired direction. In the reflective display 60, each micromirror corresponds to each pixel.

The light illuminated by the optical illumination system 1 can be reflected along the path depending on the way in which a micromirror, which corresponds to a single pixel, is tilted. When the micromirror corresponding to a predetermined pixel is switched on, light reflected by the micromirror travels toward a projection lens unit 71 of the projection optical system 70 and is enlarged by the projection lens unit 71 and transmitted towards a screen 80. In contrast, when the micromirror is switched off, the light reflected from the micromirror is directed away from the projection lens unit 71.

Thus, to produce an image, the reflective display 60 independently drives each micromirror in response to an image signal for each pixel to turn the micromirror light on or off by changing the angle of reflection of the micromirror. The image created by the reflective display 60 is enlarged by the projection lens unit 71 and projected onto the screen 80. Here, since the micromirror can reflect more than 90% of incident light, the reflective display 60 having the DLP device provides a high optical efficiency. Furthermore, the reflective display 60 having a DLP device provides a quick device response, thus making it possible to represent moving pictures more naturally and smoothly than on a conventional LCD.

The image projection system according to the present invention can be used in rear projection televisions and front projection projectors.

Although the optical illumination system 1 includes a lamp type light source that emits white light as the light source 10, it is not limited by the embodiments set forth herein. That is, in the optical illumination system 1, the light source 10 may be a white LED, a plurality of LEDs for each color, or a plurality of LDs for each color. In this case, the optical construction of the optical illumination system 1 can be changed accordingly.

As described above, in order to separate a path of light incident on a reflective display that is a DLP device from that of light reflected thereby, a Mangin mirror that can function as both a lens and a reflecting mirror is included, thereby attaining a simple structure in which the number of optical components required for the optical illumination system is reduced.

Thus, the optical illumination system using the Mangin mirror is easier to manufacture and optically align, and has lower manufacturing costs than a conventional total reflection prism-type optical system.

Furthermore, because of the use of the Mangin mirror instead of a prism, degradation of image contrast that tends to easily occur with a conventional total reflection prism type is eliminated while an optical loss occuring in a conventional prism is prevented, thus maximizing an illumination efficiency.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical illumination system used with an image projection system having a reflective device, comprising:
   a light source, at least one illuminating lens and a Mangin mirror to illuminate light emitted from the light source on the reflective device,
   wherein the Mangin mirror comprises a concave refracting surface that refracts and transmits light incident from the illuminating lens, and a convex reflecting surface disposed behind the concave refracting surface to internally reflect the light refracted by the concave refracting surface back toward the concave refracting surface and tilted with respect to the illuminating lenses, and the light reflected from the convex reflecting surface and then refracted through the concave refracting surface propagates along a path that is different from a path of the light emitted from the illuminating lens.

2. The optical illumination system of claim 1, wherein the concave refracting surface has a negative radius of curvature of about 20 to 70 mm, and the convex reflecting surface has a negative radius of curvature of about 30 to 100 mm.

3. The optical illumination system of claim 2, wherein the light source comprises a lamp type, and the system further comprises an optical element disposed between the light source and the illuminating lenses to convert the light emitted from the light source into a uniform beam and to change a shape of the beam into another shape corresponding to a plane of the reflective device.

4. The optical illumination system of claim 3, wherein the optical element comprises a light tunnel.

5. The optical illumination system of claim 1, wherein the light source comprises a lamp type light source, and the system further comprises an optical element disposed between the light source and the illuminating lenses to convert the light emitted from the light source into a uniform beam and to change a shape of the beam into another shape corresponding to a plane of the reflective device.

6. The optical illumination system of claim 5, wherein the optical element comprises a light tunnel.

7. The optical illumination system of claim 5, further comprising:
   a color separation unit that separates the light emitted from the light source according to a wavelength of the light.

8. The optical illumination system of claim 1, further comprising:
   a color separation unit that separates the light emitted from the light source according to a wavelength of the light.

9. The optical illumination system of claim 8, wherein the color separation unit comprises:
   a color wheel that separates the light emitted from the light source according to a wavelength of the light and sequentially transmits the separated light; and
   a driving source that rotates the color wheel.

10. The optical illumination system of claim 8, wherein the reflective device comprises a reflective display that includes a two-dimensional array of micromirrors, each being driven in such a manner as to selectively reflect the illuminated light in a desired direction.

11. The optical illumination system of claim 1, wherein the reflective device comprises a reflective display that includes a two-dimensional array of micromirrors, each being driven in such a manner as to selectively reflect the illuminated light in a desired direction.

12. An image projection system comprising:
   a reflective display; and
   an optical illumination system comprising,
      a light source, and
      at least one illuminating lens and a Mangin mirror that illuminate light emitted from the light source on the reflective display,
   wherein the Mangin mirror comprises a concave refracting surface that refracts and transmits light incident from the illuminating lenses, and a convex reflecting surface disposed behind the concave refracting surface to internally reflect the light refracted by the concave refracting surface back toward the concave refracting surface and tilted with respect to the illuminating lens, so that the light reflected from the convex reflecting surface and then refracted through the concave refracting surface propagates along a path that is different from a path of the light emitted from the illuminating lens such that the light is obliquely incident on the reflective display; and the reflective display that includes a two-dimensional array of micromirrors, each being driven in such a manner as to selectively reflect the light illuminated by the optical illumination system toward a projection optical system and forms an image.

13. The image projection system of claim 12, wherein the concave refracting surface has a negative radius of curvature in the range of about 20 to 70 mm, and the convex reflecting surface has a negative radius of curvature in the range of about 30 to 100 mm.

14. The image projection system of claim 13, wherein the light source comprises a lamp type light source, and the optical illumination system further comprises an optical element that is disposed between the light source and the illuminating lenses to convert the light emitted by the light source into a uniform beam and to change a shape of the beam into another shape corresponding to a plane of the reflective device.

15. The image projection system of claim 14, wherein the optical element comprises a light tunnel.

16. The image projection system of claim 12, wherein the light source comprises a lamp type light source, and the optical illumination system further comprises an optical element that is disposed between the light source and the illuminating lens to convert the light emitted by the light source into a uniform beam and to change a shape of the beam into another shape corresponding to a plane of the reflective device.

17. The image projection system of claim 16, wherein the optical element comprises a light tunnel.

18. The image projection system of claim 16, wherein the optical illumination system further comprises a color separation unit that separates the light emitted from the light source according to a wavelength of the light.

19. The image projection system of claim 12, wherein the optical illumination system further comprises a color separation unit that separates the light emitted from the light source according to a wavelength of the light.

20. The image projection system of claim 19, wherein the color separation unit comprises:
   a color wheel that separates the light emitted by the light source according to a wavelength of the light and sequentially transmits the separated light; and
   a driving source that rotates the color wheel.

21. An optical illumination system used with an image projection system having a reflective device and a projection optical system, comprising:
   a light source emitting light corresponding to an image along a first path; and
   a refracting and reflecting unit having a first surface and a second surface to refract the light received from the light source through the first surface toward the second surface along a second path, to reflect the refracted light toward the first surface along a third path using the second surface, and to transmit the reflected light toward the reflective device along a fourth path.

22. The optical illumination system of claim 21, wherein the first, second, third, and fourth paths are different from one another.

23. The optical illumination system of claim 21, wherein the first, second, third, and fourth paths are not parallel.

24. The optical illumination system of claim 21, wherein the first and fourth paths form an angle of less than 90°.

25. The optical illumination system of claim 21, wherein the second and third paths form an angle of less than 90°.

26. The optical illumination system of claim 21, wherein the reflective device and the light source are disposed opposite to each other with respect to a line disposed between the first and fourth paths.

27. The optical illumination system of claim 21, wherein the first surface and the second surface are concave to face the light source and the reflective device, and a thickness between the first surface and the second surface varies with respect to a distance from a center of the refracting and reflecting unit.

28. The optical illumination system of claim 21, wherein each of the first and second surfaces has a curved surface having a radius varing according to a distance from a center of the refracting and reflecting unit.

29. The optical illumination system of claim 21, wherein the refracting and reflecting unit further comprises an optical medium disposed between the first and second surfaces, and a thickness varies according to a distance from a center of the refracting and reflecting unit.

30. The optical illumination system of claim 21, wherein the refracting and reflecting unit comprises a Mangin mirror.

* * * * *